July 3, 1956  W. G. MITCHELL  2,753,072
TOOL FOR INSTALLING TUBULAR RIVETS
Filed Aug. 12, 1952  2 Sheets-Sheet 1

INVENTOR.
WALTER G. MITCHELL
BY
Davis, Lindsey, Hibben & Noyes
ATTORNEYS

July 3, 1956  W. G. MITCHELL  2,753,072
TOOL FOR INSTALLING TUBULAR RIVETS
Filed Aug. 12, 1952  2 Sheets-Sheet 2

INVENTOR.
WALTER G. MITCHELL
BY
Davis, Lindsey, Hibben & Noyes
ATTORNEYS

United States Patent Office 2,753,072
Patented July 3, 1956

2,753,072

TOOL FOR INSTALLING TUBULAR RIVETS

Walter G. Mitchell, Aurora, Ill., assignor to Thor Power Tool Company, Chicago, Ill., a corporation of Delaware Application August 12, 1952, Serial No. 303,953

17 Claims. (Cl. 218—45)

This invention relates to power actuated portable tools for installing and collapsing internally threaded tubular rivets and/or clinch nuts as employed for fastening or securing means in industrial and other work.

The principal object and purpose of my invention is to provide the tool with an impact clutch mechanism for imparting rotational hammer blows to the securing means engaged by the tool to collapse and/or clinch the same.

A further object of my invention is to provide an inclined plane or screw means in the impact mechanism to impart the required drawing action on the securing means in its collapsing or clinching operation.

A further object of my invention is to have the impact clutch operate through said drawing means to impart rotational hammer blows for tightly collapsing or clinching the securing means.

A further object of my invention is to provide means to adjust the collapsing or clinching stroke of the tool to vary the extent of the gripping or clinching ranges and diameters of rivets and/or clinch nuts.

The invention consists further in the structural features and combinations thereof as hereinafter described and claimed.

Figure 1:
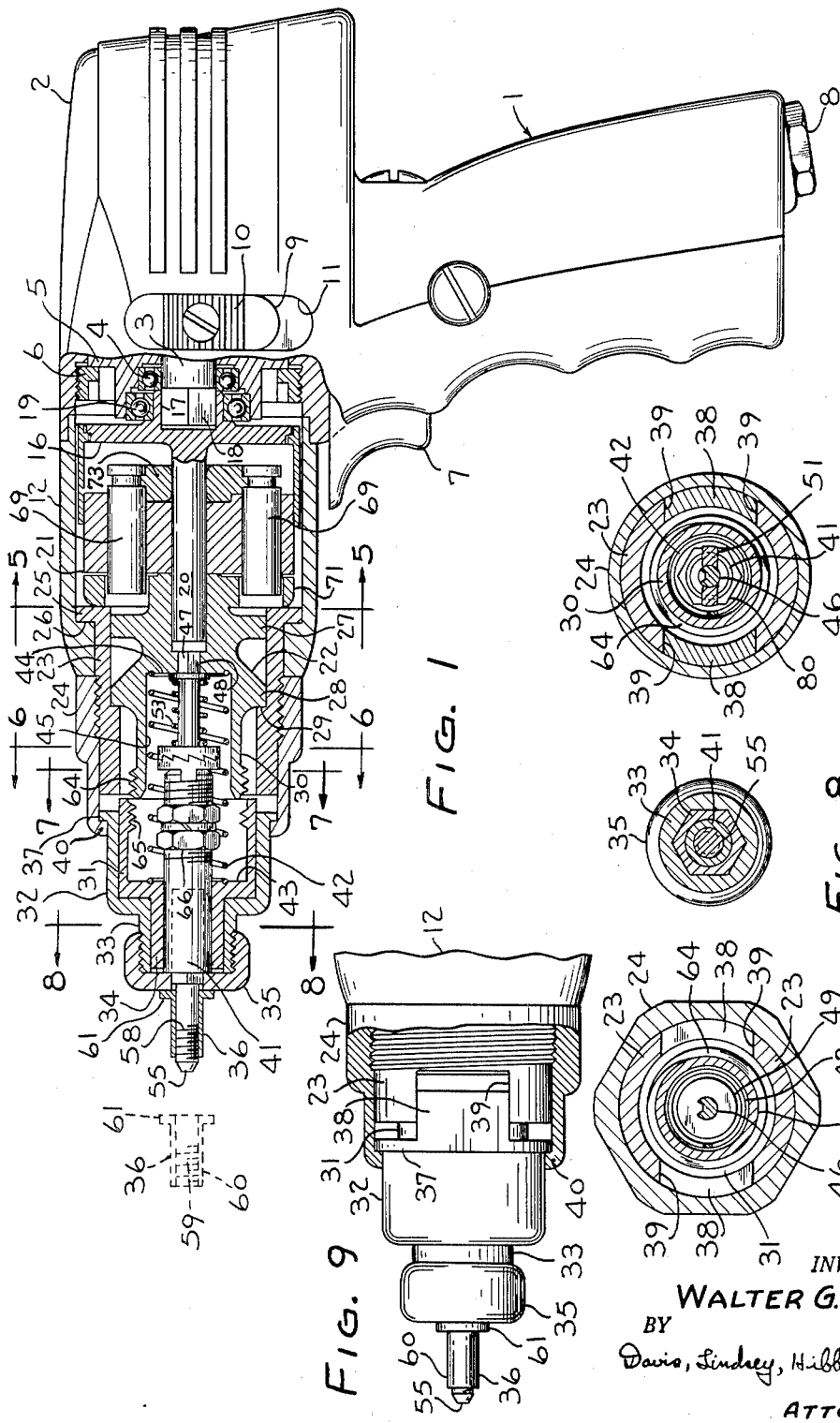
Fig. 1 is a side elevational view with parts broken away and in longitudinal section, respectively, of a portable power operated riveting tool embodying my invention.

Figs. 6, 7 and 8 are similar sectional views taken on lines 6—6, 7—7 and 8—8, respectively, of Fig. 1 to show details of the construction to be hereinafter described; and Fig. 9 is a fragmentary side elevational view partly in section to illustrate a non-rotative connection to be hereinafter described.

In the drawings, the tool shown is of the portable pneumatically operated type having a grip handle 1 secured to the motor case 2 adjacent its rear end and in which motor case is mounted a bladed rotor as commonly provided in tools of this character. The forward trunnion 3 of the rotor is shown in Fig. 1 journalled in an anti-friction bearing 4 carried by an end plate 5 which closes the front end of the motor case 2 and is clamped therein by a ring nut 6. The trunnion 3 extends through the plate 5 as shown.

The compressed air is supplied to the tool to rotate the motor through the handle 1, the latter having an air supply passage therein (not shown) for the purpose. The handle 1 mounts a spring biased throttle valve (not shown) for said passage and which valve is opened by a trigger 7 slidably mounted in the handle and depressible by a finger of the operator's hand grasping and holding the tool by the handle. The outer or butt end of the handle 1 has a fixture 8, whereby the air supply hose (not shown) may be attached to the tool.

The rotor is reversibly rotatable and a shiftable sleeve (not shown) in the motor assembly for controlling the direction of rotation of the rotor is under the control of the operator of the tool through an actuator in the form of a slide 9 having a knob 10 in a slot 11 in the motor case 2 at one side thereof and within convenient reach of the thumb of the operator's hand grasping the handle 1. The slot 11 is arranged to extend transversely of the motor or tool axis, and the slide 9 is movable up and down by the operator's thumb. In Fig. 1 the slide 9 is shown moved to the upper end of the slot 11 to rotate the motor in a clockwise direction to apply a tubular rivet or clinch nut and collapse it. When the slide 9 is moved to the lower end of the slot 11, the motor is set to rotate in the reverse or counterclockwise direction to release the tool from the collapsed rivet or fastening element.

Figure 5:
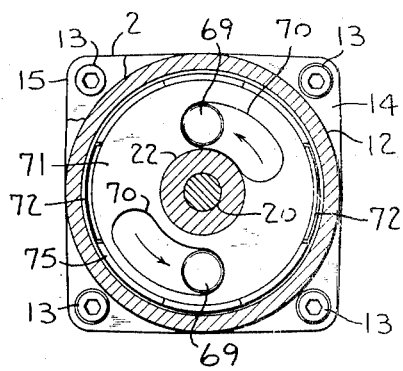
Fig. 5 is a cross-sectional view taken on line 5—5 of Fig. 1 to show the impact rods and the abutments against which the rods strike in the operation of the tool.

The impact clutch mechanism for the tool is in the form of an attachment to the motor case 2 and comprises a unit having an outer case 12 secured at its inner end to the motor case 2 by a number of fastening screws 13, as shown in Fig. 5. As there illustrated, the outer casing 12 is provided with a flange 14 to receive the screws 13 and seat the casing 12 against the flanged end 15 of the motor case 2.

The impact clutch assembly for the tool is mounted within the casing 12 and is similar to the construction and operation of the impact clutch disclosed and claimed in U. S. Patent No. 2,564,224, issued August 14, 1951, on application Serial No. 660,348, filed April 8, 1946, by Walter G. Mitchell and Louis P. Fosnot.

As herein shown, the clutch mechanism located within the casing 12 has an annular disk-shaped driving member 16 connected with the trunnion 3 for direct drive by the tool motor. The connection comprises a socket 17 on the disk 16 receiving and fitting a non-circular portion 18 of the trunnion 3, as shown in Fig. 1. An anti-friction bearing 19 is provided in the end plate 5 surrounding the socket 17.

As further illustrated, the disk 16 has a centrally disposed shaft 20 extending axially through a rotary hammer member 21 and into a rotary anvil member 22 which is in alignment with and opposed to the member 21, but shaft 20 is otherwise unconnected with either of members 21 and 22. Said anvil member 22 is revolvably mounted in a sleeve or bushing 23 fitting in part in the outer casing 12 and extending into an adjoining nozzle housing 24. The latter is provided with internal screw threads which engage external screw threads on the sleeve 23 for clamping a flange portion 25 at the inner end of the sleeve 23 against a shoulder 26 on the casing 12, as detailed in Fig. 1.

Figure 2:
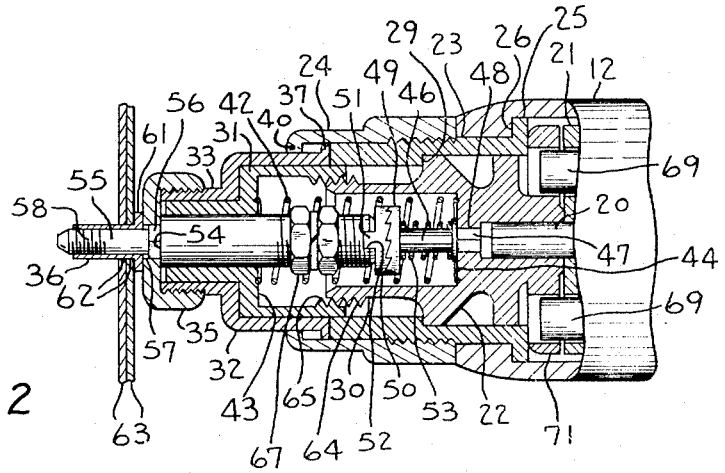
Fig. 2 is a similar sectional view of the forward end portion of the tool showing a tubular rivet inserted thereby into registering openings in overlapping plates or layers to be riveted or secured together.
Figure 3:
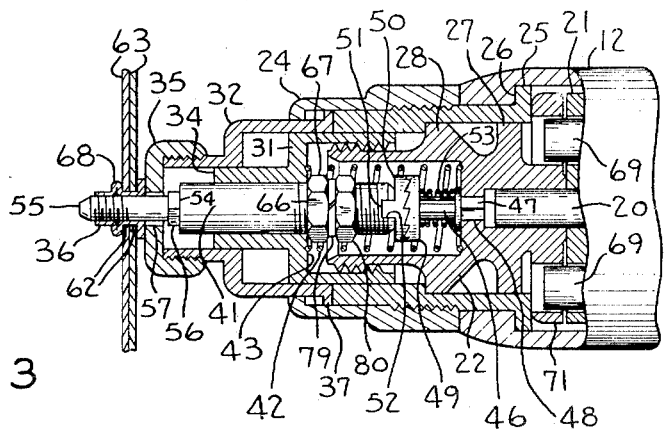
Fig. 3 is a similar sectional view of the same parts showing the tubular rivet upset or collapsed against said plates.

The anvil member 22 has spaced annular portions 27, 28 which revolvably mount the anvil member 22 within the sleeve 23, the outer support 28 working against a shoulder 29 within the sleeve 23, as shown in Figs. 1 to 3.

The anvil member 22 has a forwardly-extending rigid or integral hollow cylindrical portion 30 adapted to enter and engage a sleeve 31 which is slidably but non-rotatably mounted within a nozzle section 32 at the forward end of the tool. Said nozzle section 32 has a tubular extension 33 in which a reduced end portion 34 of the sleeve 31 is received, the parts interfitting by matching non-circular sections as shown in Fig. 8.

A cap-nut 35 is threaded on the outer end of the nozzle extension 33 to close the front end of the tool and provide an anvil against which a tubular rivet or clinch nut 36 is seated in the use of the tool.

The nozzle 32, as shown in Fig. 9, has an annular flange 37 at its inner end and from this flange extend a pair of diametrically disposed tongues 38 having a sliding fit within similarly arranged endwise slots 39 in the sleeve 23. This construction holds the nozzle 32 against rotation but allows relative longitudinal movement of the nozzle 32 on pressing the tool axially against the work and in response to spring means on releasing the tool from the work as hereinafter described. The flange 37 abuts the forward axial end of the sleeve 23 for limiting the extent of relative inward movement of the nozzle 32. To limit the outward movement of the nozzle 32, the nozzle housing 24 has a flange 40 to be engaged by the nozzle flange 37, as detailed in Figs. 1 and 9. The parts are so positioned, as shown in Fig. 1, when applying a tubular rivet or clinch nut 36 to the tool spindle next to be described.

Journalled in the sleeve extension 34 is a rotatable spindle 41 in alignment with the shaft 20 and extending rearwardly into the cylindrical portion 30 of the anvil 22, as shown in Figs. 1 to 3. A helical spring 42 surrounds the spindle 41 and bears at its outer end against the sleeve 31 at its wall 43. The opposite end of the spring 42 extends into the cylindrical portion 30 of the anvil and contacts the wall 44 at the base of its cylindrical cavity 45.

Arranged between the shaft 20 and the spindle 41 is a splined shaft section 46 having an arbored rear end 47 fitting in a like-shaped recess 48 in the wall 44 of the anvil member 22 and having a telescopic fit at its forward end in the spindle 41. Keyed slidably on the shaft 46 is a slip clutch member 49 having inclined clutch teeth for cooperation with complementary clutch teeth on a companion slip clutch member 50 slidably and rotatably mounted on the shaft 46. Clutch member 50 has diametric lugs 51 which interfit in similarly arranged slots 52 in the adjacent end of the spindle 41 to drivingly connect the spindle 41 to the shaft 46 for rotating the spindle 41 by the anvil member 22 at the proper time in the sequence of operations of the tool. The clutch member 49 is pressed towards the clutch member 50 by a relatively light coil spring 53 surrounding the shaft 46 and bearing against the clutch member 49 and the base wall 44 of the cavity 45, respectively.

The spring 53 normally presses the spindle 41 at its outer end surface 54 against the cap-nut 35, and at this point the spindle 41 is fitted with a mandrel 55 secured in place coaxially on the spindle 41 by a nut 56 which, together with the mandrel 55, extends through a centrally disposed aperture 57 in the cap-nut 35. The mandrel 55 projects from the front end of the tool and has external screw threads 58 which are designed to engage internal screws 59 (Fig. 1—dotted lines) in the hollow stem or body portion 60 of the tubular rivet or clinch nut 36 shown in Figs. 1 to 3 and 9.

In the initial step of installing and upsetting a tubular rivet or clinch nut 36, the operator of the tool holds the fastener element 36 between the fingers of one hand and inserts the mandrel 55 into the tubular or body portion 60 of the element 36 with its end or base flange 61 towards the cap-nut 35. The trigger 7 is then pressed whereby the tool motor is rotated clockwise (looking from right to left in Fig. 1), whereby rotation of disk 16 carries lugs 78 of flyweights 72 clockwise causing said flyweights to move outwardly thus shifting cross-member 73 forwardly causing bars 69 to engage slots 70 to rotate anvil 22 and mandrel 55 clockwise to engage the threads 58 on the mandrel with the threads 59 of the fastener. When the end or base flange 61 of the fastener is drawn against the cap-nut 35, the resistance offered by the seated and held fastener overcomes the pressure of the relatively light spring 53 and the clutch member 49 slips at the point of engagement of its teeth with respect to the teeth of the clutch member 50 thereby discontinuing threading of the rivet 36 onto the mandrel of the tool, the motor being continued in rotation, the trigger 7 being held depressed and the teeth of the slip clutch means 49, 50 slipping during the remainder of the rivet collapsing or upsetting operation while the fastener 36 is held against the cap-nut 35. The parts are shown in this seated position of the fastener 36 in Fig. 1.

Now the fastener 36 on the mandrel 55 is inserted by means of the tool into the registering openings 62 in the overlapping work plates 63, 63 to be riveted together, as shown in Fig. 2. The fastener 36 is inserted into said plates 63 until its base flange 61 contacts the outermost of the plates. The entire tool is now pressed axially against the work 63, 63 so that the tool housing 12, 24 and the sleeve 23 shift axially as a unit in the direction of the cap-nut 35 and sleeve 31 against the resistance of the springs 42 and 53. In this manner the tubular extension 30 of the anvil 22 is likewise moved axially toward the sleeve member 31 to engage the external screw threads 64 on the rotating extension 30 with the internal screw threads 65 on the nonrotatable but slidable sleeve 31, as shown in Fig. 2.

On engagement of the threads 64, 65 during rotation of the tubular extension 30, the sleeve 31 is drawn or cammed longitudinally into the annular space between the extension 30 and the sleeve 23, and under continued axial pressure of the tool against the work the nozzle 32 moves inwardly relative to the housing 12, 24 until the flange 37 abuts the forward axial end of the sleeve 23 as seen in Fig. 2. Upon continued rotation of the threaded extension 30, the end wall 43 of the sleeve 31 is drawn against the shoulder 66 provided by an adjusting nut 67 on the spindle 41 without affecting the rivet 36. Thereafter, continued rearward movement of the sleeve 31 retracts the spindle 41 and the mandrel 55 inwardly to collapse the tubular portion 60 of the fastener 36, as at 68, against the innermost of the work plates 63, as shown in Fig. 3. The rearward travel of the sleeve wall 43 is completed when the threads 64 on the extension 30 pass into the open space of the sleeve 31 beyond the threads 65, as shown in Fig. 3. Thereafter the anvil 22 and its extension 30 will merely continue to rotate with clutch element 49 continuing to slip relative to clutch element 50. Thus, the coacting screw threads 64, 65 function primarily as cam means, or inclined plane means, first for engaging the end wall 43 of the sleeve 31 with the adjacent surface 66 of the nut 67 and thereafter for shifting the entire assembly 49—50—41—55 rearwardly a predetermined extent along the splined shaft 46. Since the travel distance along the threads 64, 65 is constant or fixed, adjustment of the stroke of the mandrel 55 is accomplished by moving the nut 67 either closer to or further away from the sleeve wall 43.

The intensity of the clamping action of the collapsed portion 68 of the fastener 36 on the plates depends upon the rotative hammer blows imparted by the impact clutch mechanism on the anvil member 22 during rearward movement of the sleeve 31. This mechanism will now be described sufficiently to explain its use in the riveting tool herein disclosed, reference being made to my aforementioned prior Patent No. 2,564,224 for a more detailed explanation of the impact clutch.

The impact clutch mechanism comprises axially movable impact bars 69 slidably mounted in the hammer member 21, as shown in Figs. 1 to 3. These bars 69 are arranged substantially parallel to the shaft 20 and are movable into and out of concentric slots 70 (Fig. 5) in the driving plate 71 rigidly connected to the anvil member 22 and directly opposed to the hammer member 21.

The bars 69, when extending into the slots 70, as they normally do during rotation of the motor, engage the ends of said slots towards which the bars 69 are carried by the rotating hammer member 21. For example, when the motor rotation is clockwise (looking from right to left in Fig. 1), the bars 69 are carried by the hammer member 21 in a clockwise direction as indicated by the arrows in Fig. 5 (the view in Fig. 5 being from left to right in Fig. 1). Before the screw threads 64, 65 on the parts 30, 31 are engaged, the anvil member 22 is rotatable by the tool motor without substantial torque resistance, and the bars 69 engage the ends of the slots 70 uninterruptedly and clutch the anvil member 22 to the tool motor for rotation in unison therewith.

Figure 4:
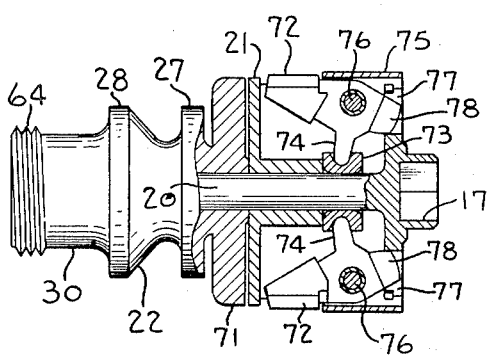
Fig. 4 illustrates the fly-weight and hammer assembly of the impact clutch employed in the tool.

After the screw threads 64 on the part 30 have been moved into engagement with the screw threads on the part 31, as described above, the torque of the tool motor is resisted sufficiently for the bars 69 to be withdrawn from the slots 70, as explained below, whereby to disconnect the drive of the tool motor from the anvil member 22 through the action of a pair of flyweights 72 which are pivoted to and within the hammer member 21, as shown in Fig. 4.

As shown in Fig. 1, the bars 69 are connected for movement in unison by a cross-member 73 slidably mounted on the shaft 20. A pair of central inwardly projecting lugs 74 (Fig. 4) on the flyweights 72 connect the latter with the cross-bar 73. A locking ring or band 75 is pressed tightly on the hammer member 21 to confine the end of the pivots 76 for the flyweights 72 in place within pivot-receiving holes in hammer 21, and also to provide a stop for the flyweights. The ends of the flyweights 72 are provided with additional lugs 78 which, as disclosed in said prior Patent No. 2,564,224, are received in and cooperate with cam recesses 77 in the disk 16. These pivots 76, and the lugs 78 coacting with the edges of the recesses 77 in the disk 16, provide a permanent driving connection between the hammer 21 and the disk 16. However, when the anvil 22 encounters the aforementioned torque resistance by reason of the engagement of the screw threads 64 and 65, rotation of the hammer 21 is consequently resisted, but the driven disk 16 continues to rotate by reason of the driving connection 17, 18 with the rotor trunnion 3 and the pivoted flyweights 72 are cammed inwardly from the position shown in Fig. 4 by the walls of the recesses 77 in the disk 16 thereby effecting rearward shift of cross-member 73 and resultant retraction of the bars 69 from the anvil slots 70. Upon such disconnection of the anvil 22 from the hammer 21, rotation of the anvil 22 ceases momentarily, the tool motor accelerates under the reduced load, and the flyweights 72, responding to centrifugal force, pivot outwardly to their Fig. 4 position, and thereby actuate the cross-member 73 for projecting the bars 69 into the anvil slots 70. The bars 69 strike the ends of the slots 70 with an impact so that rotation of the hammer 21 is momentarily halted but rotation of disk 16 continues whereupon the above-described camming action of the lugs against the walls of the recesses 77 of the rotating disk 16 is repeated and the lugs 78 are again pivoted so that the bars 69 are again retracted from the anvil slots 70. The alternate inward and outward pivoting the flyweights 72, in response to camming action and centrifugal force, respectively, results in repeated rotational hammer blows or impacts being imparted to the anvil 22 so that repeated axial collapsing or upsetting pressure is imparted to the rivet 36 through the mandrel 55, thereby insuring a tight clamping or securing action of the rivet on the plates 63.

With respect to the nozzle assembly 31, 32, the parts 31, 32 are joined non-rotatively by the non-circular section 34, as shown in Fig. 8. The torque of the tool motor acting through the clutch 49, 50 cannot rotate the sleeve 31 because of the non-circular connection with the nozzle 32 which is in turn held against rotation in parts 23 and 24 and housing 12 by the tongues 38. Due to the fact that the threads 64, 65 are not in engagement at the time the clinch nut 36 is drawn onto the mandrel 55, the only driving force available to accomplish this operation of drawing the fastener 36 onto the mandrel 55 is the power transmitted by the clutch 49, 50. The tongues 38 and the slots 39 are always engaged, and the threads 65 never rotate. Pressing the tool axially against the work engages the threads 64, 65 and permits application of the tremendous force produced by the impact clutch in moving the mandrel 55 rearwardly along the inclined plane of the nonrotating thread 65 or equivalent part as heretofore described.

After the fastener 36 has been collapsed and riveted against the plates 63, the direction of rotation of the tool motor is reversed by shifting of the slide 9 and the mandrel 55 is unscrewed from the internal threads of the fastener 36 thereby completing the riveting or clinching operation.

It may be pointed out that the teeth on the supplemental clutch members 49, 50 have their shoulders disposed to positively lock said members for reversely rotating the spindle 41 and its mandrel 55 to release the fastener 36.

The torque transmitted by the clutch means 49, 50 can be controlled by the stiffness of the spring 53. This will permit selection of the torque requirements to the tightness of fit of the threads in the fastener 36. The amount of mandrel rise and, in turn, the amount of collapsing of the fastener 36 can be adjusted on the positioning of the nut 67, lockwasher 79 and lock nut 80 mounted on the mandrel as shown in Figs. 1 to 3. It will be noted that the spindle 41 is screw threaded rearwardly of the sleeve wall 43 to accommodate these clamp nuts. By adjusting the clamp nut 67 lengthwise of the spindle, the riveting stroke of the spindle and its mandrel 55 can be adjusted to vary the tightness imparted to the collapsed section 68 of the fastener 36. This adjustment is provided in order to accommodate a multiplicity of grip ranges and amount of set given to tubular rivets.

The adaptation of an impact clutch mechanism to impart rotary impact blows to the fastener to collapse or clinch it, as heretofore described, provides a novel and advantageous tool of this character. The tool structure is simple in construction and operation and is efficient in its use. For rivets with right-hand threads, the tool motor is rotated to the right or clockwise. A reverse rotation is employed for left-hand threads.

The details of construction and arrangement of parts herein shown and described may be variously changed and modified without departing from the spirit and scope of my invention, except as pointed out in the annexed claims.

I claim:

1. In a tool of the character described for installing internally threaded tubular rivets and the like, a motor, a rotatable and longitudinally shiftable spindle having an externally threaded portion adapted to be rotatably engaged with and disengaged from a rivet, and means including impact clutch means responsive to rotation of the motor for retracting the spindle and imparting rotational hammer blows to the spindle for collapsing the rivet engaged by the spindle.

2. In a tool of the character described for installing internally threaded tubular rivets and the like, a support, a motor in the support, a pair of relatively movable members carried by said support, one of said members being rotated by said motor and the other of said members being slidably but non-rotatably mounted on the support, and rivet-engaging means for releasably engaging and holding a rivet, said means coacting with the slidable member for collapsing the tubular portion of the rivet against the work in response to sliding movement of said slidable member, and said members having screw threads engageable on pressing the tool axially against the work for drawing the slidable member towards the rotatable member whereby to effect collapsing of the rivet.

3. In a tool of the character described for installing internally threaded tubular rivets and the like, a support, a retractable spindle shiftably mounted in the support and having a threaded outer end extending beyond the support for rotatable engagement and disengagement with respect to a rivet, drive means mounted in the support and operatively connected to the spindle for rotating the latter, and spindle-retracting means operatively connected to said drive means for retracting said spindle inwardly of the support whereby to collapse the rivet engaged by the spindle, said spindle-retracting means comprising a pair of coacting telescopic sleeve members, one of said sleeve members being rotatably mounted in the support and operatively connected to said drive means for rotation thereby and the other of said sleeve members being slidably but non-rotatably mounted in said support in coaxial relation with said one sleeve member, and spring means normally urging said sleeve members to separated disengaged position, said other sleeve member being operatively engageable with said spindle for shifting the latter, and said sleeve members having coacting threaded portions adapted to be operatively engaged upon pressing movement of the tool axially against the work for drawing said other sleeve member inwardly relative to said one sleeve member whereby to retract said spindle and thereby effect collapsing of the rivet engaged by the spindle.

4. In a tool of the character described for installing internally threaded tubular rivets and the like, an elongated tool housing, a relatively movable nose portion at the forward end of said housing mounted for limited rearward movement longitudinally of the housing, a rotatary and axially movable spindle mounted in said housing and having a threaded outer end extending through said nose portion for releasably engaging a rivet, a motor mounted adjacent the rear end of said housing for rotating said spindle, a spindle-engaging member mounted in said nose portion and movable rearwardly thereof for engaging said spindle and retracting the same inwardly of the housing whereby to collapse the rivet engaged by the spindle, and retracting means mounted in said housing rearwardly of said nose portion and driven by said motor and adapted to coact with said spindle-engaging member for moving the latter rearwardly, said retracting means being operatively engageable with said spindle-engaging member in response to relative rearward movement of said nose portion upon pressing of the tool axially against the work.

5. In a tool of the character described for installing internally threaded tubular rivets and the like, an elongated tool housing, a relatively movable nose portion at the forward end of said housing mounted for limited rearward movement longitudinally of the housing, a rotary and axially movable spindle mounted in said housing and having a threaded outer end extending through said nose portion for releasably engaging a rivet, a motor mounted adjacent the rear end of said housing for rotating said spindle, spindle-retracting means including a rotating member mounted in said housing rearwardly of said nose portion and connected to said motor for rotation whereby and a cooperating spindle-engaging member slidably but non-rotatably mounted in said nose portion and adapted to engage said spindle for moving the latter rearwardly within the housing whereby to collapse the rivet engaged by said spindle, spring means coacting between said members for normally urging the members to disengaged position, and abutment means within said housing and coacting with said nose portion for limiting the extent of inward movement of the latter, said members being operatively engageable for effecting rivet-collapsing retracting movement of said spindle in response to relative rearward movement of said nose portion upon pressing of the tool axially against the work.

6. In a tool of the character described for installing internally threaded tubular rivets and the like, a support, a motor mounted adjacent one end of the support, a spindle-retracting member slidably but non-rotatably mounted adjacent the opposite end of the support, a spindle journalled and slidably mounted in said member and having means for releasably engaging and holding a rivet, and means operatively connected to said motor for shifting said member axially within said support, said member and said spindle having coacting separable abutment portions adapted to be engaged upon movement of said member toward the motor whereby to collapse the tubular portion of the rivet against the work.

7. In a tool of the character described for installing internally threaded tubular rivets and the like, a support, a motor mounted adjacent one end of the support, a spindle-retracting member slidably but non-rotatably mounted adjacent the opposite end of said support, a spindle journalled and slidably mounted in said member and having means for releasably engaging and holding a rivet, means actuated by said motor for shifting said member axially within said support, separable coacting means on said spindle and said member for drawing the spindle by the member toward the motor whereby to collapse the tubular portion of the rivet against the work, and means for varying the spacing between said coacting means for adjusting the riveting stroke of the spindle.

8. In a tool of the character described for installing internally threaded tubular rivets and the like, a support, a motor mounted adjacent one end of the support, a spindle-retracting member slidably but non-rotatably mounted on said support, a spindle journalled and slidably mounted in said member and having means for releasably engaging the internal threads of a rivet, and means actuated by said motor for shifting said member axially within said support, said member having an abutment portion and said spindle carrying a threaded element adapted to be engaged by said abutment portion for drawing the spindle with the member toward the motor whereby to collapse the tubular portion of the rivet against the work, said threaded element being adjustable axially on the spindle for adjusting the riveting stroke of the latter.

9. In a tool of the character described for installing internally threaded tubular rivets and the like, a support, a motor mounted adjacent one end of the support, a spindle-retracting member slidably but non-rotatably mounted on said support, a spindle journalled and slidably mounted in said member and having means for releasably engaging the internal threads of a rivet, a rotating member in said support connected to said motor in coacting relation with said spindle-retracting member, said members having cooperating threaded portions adapted to be engaged by pressing the tool axially against the work for drawing said spindle-retracting member a predetermined distance toward said motor, a shoulder portion on said spindle-retracting member and a coacting adjustable abutment carried on said spindle and adapted to be engaged by said shoulder portion upon movement of said spindle-retracting member toward the motor whereby to collapse the tubular portion of the rivet, said abutment being adjustable longitudinally on said spindle whereby to vary the normal spacing between said shoulder portion and said abutment for regulating the riveting stroke of the spindle.

10. In a tool of the character described for installing internally threaded tubular rivets and the like, a motor, a rotatable and longitudinally shiftable spindle having an externally threaded portion adapted to be engaged with and disengaged from a rivet, means acting in response to the rotation of the motor for moving the spindle longitudinally of the tool for collapsing the rivet engaged by the spindle, and means including impact clutch means operatively connecting the spindle to the motor for imparting rotational hammer blows to the spindle during rivet-collapsing longitudinal movement thereof.

11. In a tool of the character described for installing internally threaded tubular rivets and the like, a motor, a rotatable and longitudinally shiftable spindle having an externally threaded portion adapted to be engaged with and disengaged from a rivet, cam means operatively connected to the spindle and responsive to the rotation of the motor for moving the spindle longitudinally of the tool for collapsing the rivet engaged by the spindle, and impact clutch means operatively connected to said cam means for imparting rotational hammer blows to the spindle during rivet-collapsing longitudinal movement thereof.

12. In a tool of the character described for installing internally threaded tubular rivets and the like, a support, a motor in the support, a pair of relatively movable members carried by said support, one of said members being rotated by said motor and the other of said members being slidably but non-rotatably mounted on the support, rivet-engaging means for releasably engaging and holding a rivet, said rivet-engaging means coacting with the slidable member for collapsing the tubular portion of the rivet against the work in response to sliding movement of said slidable member and said members having screw threads engageable on pressing the tool axially against the work for drawing the slidable member towards the rotatable member whereby to effect collapsing of the rivet against the work, and impact clutch means interposed between said motor and said rotatable member for imparting rotational hammer blows to the latter during rivet-collapsing movement of said slidable member.

13. In a tool of the character described for installing internally threaded rivets and the like, a support, a pair of relatively shiftable action and reaction members in the support, one of said members comprising a rotary spindle extending through the other member and having a threaded outer end for rotary engagement and disengagement with respect to the threaded portion of a rivet, a rotary motor mounted in the support and operatively connected to the spindle for rotating the latter, means in said support responsive to rotation of the motor for effecting relative shifting movement between the action and reaction members whereby to collapse the rivet engaged by the spindle, means operatively interconnecting said motor and said spindle comprising a shaft drivingly connected to said motor at one end thereof and having an axially slidable telescopic connection at its opposite end with said spindle, and slip clutch means slidably mounted on said shaft and interposed in driving relation between said shaft and said spindle for effecting selective engagement and disengagement between the threaded end of the spindle and the rivet before and after the rivet-collapsing relative movement between said action and reaction members.

14. In a tool of the character described for installing internally threaded tubular rivets and the like, a support, retainer means at the forward end of the support for engaging the head portion of a rivet, a rotary and axially shiftable spindle extending through said retainer means and having a threaded outer end for rotary engagement and disengagement with respect to the threaded tubular portion of the rivet, a rotary motor mounted in the support for rotating the spindle, spindle-retracting means operative in response to rotation of the motor for shifting the spindle rearwardly relative to said retainer means whereby to collapse the rivet engaged by the spindle, means operatively interconnecting said motor and said spindle comprising a shaft drivingly connected to the motor at one end thereof and having an axially slidable telescopic connection at its opposite end with said spindle, and slip clutch means slidably mounted on said shaft for rearward movement thereof during rearward shifting of said spindle, said slip clutch means being interposed in driving relation between said shaft and said spindle for effecting selective engagement and disengagement between the threaded end of the spindle and the rivet.

15. The device of claim 14 further characterized in that said slip clutch means comprises a pair of spring-pressed toothed members carried on said shaft and adapted to slip at a predetermined torque resistance in one direction of rotation during engagement of the rivet with the spindle and adapted to be held in direct driving relation in the opposite direction of rotation during disengagement of the spindle from the rivet.

16. In a tool of the character described for installing internally threaded tubular rivets and the like, a support, a reversible motor in the support, a spindle journalled and slidably mounted in said support and having a threaded end for engaging and disengaging the threaded portion of a rivet, spindle-retracting means for shifting the spindle inwardly of the support whereby to collapse the rivet engaged by the spindle, a main clutch operatively connecting said spindle and said spindle-retracting means to said motor, and a second clutch operatively connecting the motor to the spindle through said main clutch for selectively connecting and disconnecting the spindle to and from the rivet in advance of and following the rivet-collapsing shifting movement of the spindle.

17. In a tool of the character described for installing internally threaded tubular rivets and the like, a support, a reversible motor in the support, a spindle journalled and slidably mounted in said support and having a threaded end for engaging and disengaging the threaded portion of a rivet, spindle-retracting means for shifting the spindle inwardly of the support whereby to collapse the rivet engaged by the spindle, impact clutch means operatively connecting said motor to said spindle-retracting means for imparting rotational hammer blows to the latter during rivet-collapsing shifting movement of the spindle, and slip clutch means operatively connecting said motor to the spindle through said impact clutch means for selectively connecting and disconnecting the spindle to and from the rivet in advance of and following the rivet-collapsing shifting movement of the spindle.

References Cited in the file of this patent

UNITED STATES PATENTS

| | | |
|---|---|---|
| 2,423,956 | Amtsberg | July 15, 1947 |
| 2,423,957 | Amtsberg | July 15, 1947 |